(12) United States Patent
Crete et al.

(10) Patent No.: US 7,940,996 B2
(45) Date of Patent: May 10, 2011

(54) IMAGE NOISE DETECTION

(75) Inventors: Frédérique Crete, La Buisse (FR); Marina Nicolas, Voreppe (FR); Patricia Ladret, Lans en Vercors (FR)

(73) Assignee: STMicroelectronics SA, Montrouge (FR)

( * ) Notice: Subject to any disclaimer, the term of this patent is extended or adjusted under 35 U.S.C. 154(b) by 972 days.

(21) Appl. No.: 11/775,730

(22) Filed: Jul. 10, 2007

(65) Prior Publication Data
US 2008/0013854 A1    Jan. 17, 2008

(30) Foreign Application Priority Data

Jul. 12, 2006 (FR) ....................................... 06 06363

(51) Int. Cl.
*G06K 9/40* (2006.01)
*G06K 9/36* (2006.01)
(52) U.S. Cl. ...................................................... 382/266
(58) Field of Classification Search .................. 382/232, 382/254, 260–264, 268, 274, 275; 358/3.1, 358/463, 509, 514, 530
See application file for complete search history.

(56) References Cited

U.S. PATENT DOCUMENTS

| 7,230,741 B2 * | 6/2007 | Ernandes et al. .............. 358/3.1 |
| 7,432,985 B2 * | 10/2008 | Ishikawa et al. .............. 348/616 |
| 7,719,731 B2 * | 5/2010 | Saka et al. ..................... 358/514 |
| 2005/0002574 A1 * | 1/2005 | Fukuhara et al. ............. 382/232 |
| 2006/0245640 A1 * | 11/2006 | Szczuka ........................ 382/154 |

OTHER PUBLICATIONS

Pan et al., "A locally adaptive algorithm for measuring blocking artifacts in images and videos," Signal Processing: Image Communication, vol. 19, 2004, pp. 499-506.
Chou, J. et al., "A Simple Algorithm for Removing Blocking Artifacts in Block-Transform Coded Images," IEEE Signal Processing Letters, vol. 5, No. 2, Feb. 1998, pp. 33-35.
Pan, F. et al., "A Locally-Adaptive Algorithm for Measuring Blocking Artifacts in Images and Videos," Proceedings of the International Symposium on Circuits and Systems, May 23, 2004, pp. 925-928.

* cited by examiner

*Primary Examiner* — Amir Alavi
(74) *Attorney, Agent, or Firm* — Lisa K. Jorgenson; Robert Iannucci; Seed IP Law Group PLLC (57) ABSTRACT

An image comprises columns and rows of blocks of pixels. In each row and/or column, a series of pairs of blocks of pixels comprise first and second adjacent blocks of pixels, with the second block in a previous pair of blocks corresponding to the first block in a next pair of blocks. For at least a part of the pairs of blocks in at least a part of the rows and/or columns of blocks in the image, a method determines an indication of a block boundary between the first and second blocks. The method decides based on the determined indication whether the block boundary is a visible or invisible block boundary. These steps are then repeated for a next pair. If at least one invisible block boundary is present between two visible block boundaries, it is decided that a uniform image distortion zone has been detected.

25 Claims, 3 Drawing Sheets

IMAGE NOISE DETECTION

BACKGROUND

1. Technical Field

The present invention relates to the processing of images, and more particularly the images obtained after data compression. In the context of processing digital images, each image is represented by a number of pixels per row and a number of pixels per column, with these integers varying as a function of the size of the image formats.

2. Description of the Related Art

The application of certain types of image processing, and more particularly the application of image processing for the purposes of compressing the digital data relating to the images, especially when DCT ("Discrete Cosine Transform") is used, as is the case in MPEG ("Moving Picture Experts Group") processing for example, induces artifacts in the images so processed, meaning noise in color or in movement. As a result, the images obtained after such compression may be of poor quality.

In particular, it is possible to see blocks of pixels presenting poor color uniformity from block to block. These uniform blocks of pixels appear to be delimited by respective block boundaries forming an artificial partitioning of the image which can be detected by the human eye and which can thus represent a first type of image noise.

As a general rule, the pixels of an image are processed in blocks of 8×8 pixels during compression. Under these conditions, each block of 8×8 pixels can present the same color level.

Such effects at the block level can be detected by the human eye. The greater the number of visible block boundaries present in the image, the lower the level of the image quality.

Certain algorithms known to a person having ordinary skill in the art aim to determine an image quality level based on the number of visible block boundaries which are present in an image.

The document "A Locally Adaptive Algorithm for Measuring Blocking Artifacts in Images and Videos" by F. Pan, X. Lin, S. Rahardja, W. Lin, E. Ong, S. Yao, Z. Lu and X. Yang describes an algorithm for measuring such noise so as to provide quality metrics for an image. The document proposes determining discontinuities between two blocks of adjacent pixels, meaning the presence of a visible block boundary, on the basis of a value $B_h$ which incorporates the weighted difference between the values of adjacent pixels on the boundary between the two blocks in question, for the width of these two blocks of pixels.

A value of $B_h$ which is less than 1 indicates there is no visible block boundary between the two blocks in question. However, a value of $B_h$ equal to 10 indicates a strong discontinuity between the blocks of pixels and therefore a clearly visible block boundary.

Such a value is determined for a vertical block boundary $B_v$ and for a horizontal block boundary $B_h$. Then an estimated value $B_{BLK}$ of the blockiness of a block of pixels in the image is determined from the mean of the values for a horizontal block boundary $B_h$ and for a vertical block boundary $B_v$.

Image compression can also result in a second type of image noise, consisting of producing an image comprising multiple adjacent blocks of pixels which all present the same uniformity. In such a case, the human eye can then detect an artificial uniform zone, or uniform distortion zone, in the image, which can be more or less large. Such a phenomenon results in image noise and therefore detracts from the quality of the image obtained after data compression. In this case, no block boundary is visible between two blocks of pixels 8×8 in size, because the blocks of adjacent pixels present the same color level.

The document "A Locally Adaptive Algorithm for Measuring Blocking Artifacts in Images and Videos" cited above proposes detecting this second type of image noise on the basis of a value $Z_{BLK}$ which, for a vertical block boundary takes into account the differences in pixel values relative to the 4 columns of pixels to the right of the block boundary in question and also relative to the 4 columns of pixels to the left of this same block boundary, and for a horizontal block boundary takes into account the differences in pixel values relative to 4 rows of pixels above the block boundary in question and also relative to the 4 rows of pixels below this same block boundary.

The document therefore provides a method for determining a value $B_{BLK}$ relating to the artificial discontinuities in an image and a relative value $Z_{BLK}$ relating to the uniform distortion zones in an image.

This allows estimating an image quality level $Q_{IMAGE}$ from these two values $B_{BLK}$ and $Z_{BLK}$.

However, such a method involves complex calculations based in particular on the determination of weighting coefficients and scaling factors.

In addition, such a method for detecting the two types of noise represented by the effect relating to the artificial discontinuities and by the effect relating to the uniform distortion zones, may not be relevant in certain images. Such is the case when the image in question represents text. In fact, when the image obtained after compression remains faithful to an original image which represents text, by applying such a method it is possible to conclude that the image presents noise of the second type induced by image processing, although the obtained image is actually of high quality.

BRIEF SUMMARY

In the present context, the term "visible block boundary" is understood to mean a block boundary or delimiter between two blocks of uniform pixels which is artificial and which degrades the image quality level, or more generally a delimiter between two uniform zones because multiple blocks presenting the same uniformity can be contiguous and form a uniform zone. This corresponds to the first type of image noise.

The term "invisible block boundary" is understood to mean a block boundary or delimiter between two uniform blocks of pixels, or more generally between two uniform zones, which is invisible and therefore induces noise of the second type, with these invisible block boundaries being positioned between two visible boundaries.

Note that within the same block of uniform pixels, for the detection of vertical boundaries, the pixels located in the same row present the same color level but it is possible for the color levels to differ from one row to another.

Note also that within the same block of uniform pixels, for the detection of horizontal boundaries, the pixels located in the same column present the same color level but it is possible for the color levels to differ from one column to another.

Some block boundaries in an image are neither visible block boundaries nor invisible block boundaries. In such cases they may be block boundaries corresponding to contours of objects or to textures naturally present in the original image.

A first embodiment of the invention proposes a method for processing an image in at least a first and a second dimension, comprising a series of M blocks of pixels in the first dimension and a series of N blocks of pixels in the second dimension, forming M columns of blocks of pixels and N rows of blocks of pixels, where M and N are whole non-zero numbers.

In each row and/or each column of blocks of pixels, a series of pairs of blocks of pixels each comprises a first and a second adjacent blocks of pixels, with the second block of pixels in a preceding pair of blocks corresponding to the first block of pixels in a next pair of blocks.

The process comprises the following steps for at least a part of the pairs of blocks of pixels in at least a part of said rows and/or columns of blocks of pixels in said image:

/a/ determining an indication of a block boundary between the first and second blocks of pixels in said pair of blocks of pixels, /b/ deciding on the basis of said indication of a block boundary whether the block boundary is a visible block boundary or an invisible block boundary, and /c/ repeating steps /a/ and /b/ for a next pair of blocks of pixels, If at least one invisible block boundary is present between two visible block boundaries, it is decided that a uniform image distortion zone is detected.

The visible block boundary or boundaries and the uniform distortion zone or zones indicate an image quality level.

The application of such a method allows examining the image in question and determining the visible block boundaries and invisible block boundaries which are present in the image, on the basis of shared indications. The uniform distortion zones and the number of visible block boundaries, meaning the number of artificial discontinuities, detected in this manner allow estimating a quality level for the image.

Through these measures it is possible to determine, on the basis of shared indications, a quality level for the image which takes into account the two types of image noise mentioned above. Such a method advantageously does not require a separate determination of information used to detect visible block boundaries and information used to detect uniform distortion zones.

Thus, unlike the prior art, it is advantageously possible to determine in a combined and simple manner the two types of noise that an image may contain.

When each block of pixels comprises a number C of columns of pixels and a number R of rows of pixels, with C and R being whole non-zero numbers, the first indications of a block boundary are obtained at the end of the following steps:

/1/ obtaining 2×C−1 columns of R values, each corresponding to a difference between two consecutive pixel values in a row in the corresponding pair of blocks of pixels, and /2/ obtaining 2×C−1 combined values by respectively summing the values in the 2×C−1 columns obtained in step /1/, with said 2×C−1 combined values corresponding to the indication of a block boundary for the corresponding pair of blocks of pixels.

Under these conditions, not only does the determination of the indications of block boundaries provide information about a level of image quality which includes both the first type of noise and the second type of noise, but this determination is simple to implement as well.

One can also determine such combined values by calculating the differences by column.

In this case, the indication of a block boundary is obtained at the end of the following steps:

/1/ obtaining 2×R−1 rows of C values, each corresponding to a difference between two consecutive pixel values in a column in the corresponding pair of blocks of pixels, and /2/ obtaining 2×R−1 combined values by respectively summing the values in the 2×R−1 rows obtained in step /1/, with said 2×R−1 combined values corresponding to the indication of a block boundary for the corresponding pair of blocks of pixels.

One can also determine combined values by calculating the differences both by row and by column, so as to determine indications for both the vertical block boundaries and the horizontal block boundaries. Such an embodiment allows a more precise determination of the image quality level, because the image is examined using a process of the present invention along both the rows of pixels and the columns of pixels.

In one embodiment of the invention, in step /b/ it can be decided that a block boundary is a visible block boundary when at least the following condition is met:

the sum of the combined values except for the central combined value is equal to 0.

This condition is advantageously simple to implement.

In one variation, in step /b/ it can be decided that a block boundary is a visible block boundary when at least the following additional condition is met:

the central combined value is less than a threshold value.

By applying this condition which involves a comparison with a threshold value, one can avoid the detection of a discontinuity in the color level between two blocks of pixels which is faithful to the initial image and therefore do not correspond to an artificial discontinuity, meaning a detection of a visible block boundary. Artificial discontinuities in the color level are generally less pronounced than natural discontinuities in an image. Thus, depending on the threshold value used, one can avoid confusing a discontinuity in the color level which corresponds to a natural contour in the image, in particular a border between the end of lines of text and the uniform text background, with an artificial discontinuity in the color level.

In step /b/, it can be decided that a block boundary is an invisible block boundary if the following condition is met:

the sum of the combined values is equal to zero.

In fact, when all the combined values obtained are equal to zero, this means that the values for adjacent pixels in the pair of blocks in question are equal. Therefore an invisible block boundary was detected to the extent that two visible block boundaries delimit a zone containing this invisible block boundary.

A second embodiment of the invention relates to an image processing device for implementing a method for processing an image according to the first aspect of the invention.

A third embodiment of the invention relates to a video signal decoder comprising an image processing device according to the second aspect of the invention.

Such a video signal decoder can correspond to a set top box.

A fourth embodiment of the invention relates to a computer readable medium having contents to be installed on an image processing device according to the second embodiment of the invention, comprising instructions for implementing the method according to the first embodiment of the invention when the program is executed by the processing means of the image processing device.

BRIEF DESCRIPTION OF THE SEVERAL VIEWS OF THE DRAWINGS

The invention will be better understood through the use of diagrams, where.

DETAILED DESCRIPTION

One embodiment of the invention is described below as it applies to two-dimensional images.

However, there is no limitation to the dimensions of the image processed by applying a method according to an embodiment of the invention. From the following sections, it is easy to deduce the application of such an image processing method to images comprising a number k of dimensions, where k is a number greater than 1.

In one embodiment of the invention, an image comprises C pixels per block row and R pixels per block column, with R and C being whole numbers. An image obtained from compressed data is partitioned into multiple blocks of a uniform number of pixels, with some of these blocks of pixels presenting visible block boundaries between them. Such blocks can, for example, be 8 pixels by 8 pixels in size.

Certain others of these blocks of pixels present invisible block boundaries between them, such that they appear to the human eye as if merged into one uniform distortion zone, as described above.

In order to decide whether one or more visible and/or invisible block boundaries are detected, in one embodiment of the invention an indication of all or part of the block boundaries of the image is first determined in at least one of the two dimensions of the image in question.

Figure 1:
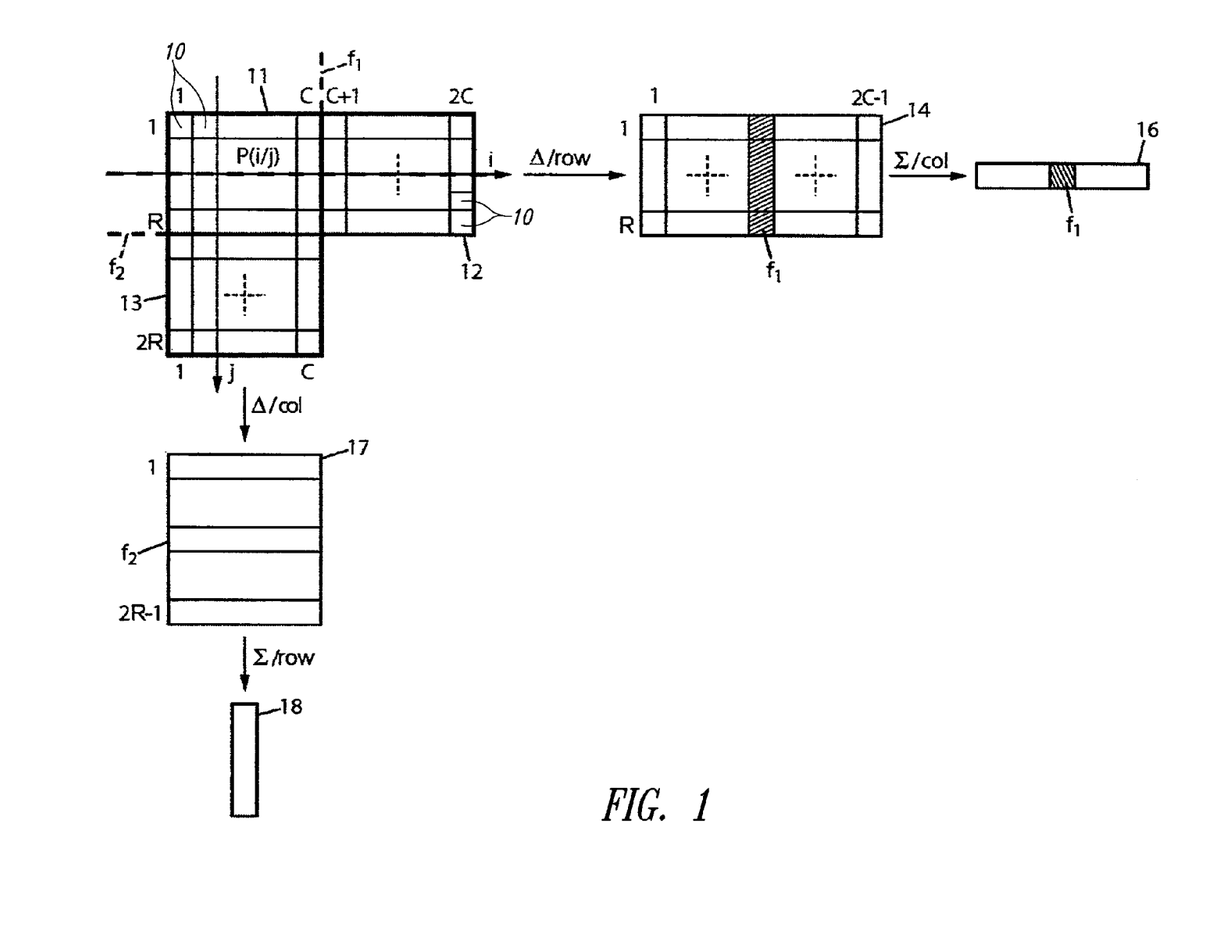
FIG. 1 illustrates a determination of an indication of a block boundary in one embodiment of the invention.

FIG. 1 illustrates a determination of such an indication of a block boundary in the image between two blocks of pixels 10 in one embodiment of the invention.

In an image, a first block 11 of pixels 10 is adjacent to a second block 12 of pixels 10, with a block boundary $f_1$ separating these blocks. The set of these two blocks 11, 12 of pixels 10 contains R rows of pixels and 2×C columns of pixels, with each pixel identifiable within the pair of blocks of pixels by p(i,j), where i is between 1 and R and j is between 1 and 2×C.

In one embodiment of the invention, for all rows of pixels in this pair of blocks of pixels, a difference is found between the values for adjacent pixels two by two by applying the following equation for i from 1 to R and for j from 1 to 2×C−1:

$$d(i,j)=|p(i,j+1)-p(i,j)| \quad (1)$$

A table 14 of values is obtained comprising a number 2×C−1 of values per row in a number R of rows. The table 14 of values is illustrated using a color code which represents zero values in white and non-zero values in color.

In the example illustrated here, a central gray column corresponds to the block boundary between the block 11 of pixels and the block 12 of pixels. This column represents the values for d(i,j) obtained when j is equal to C.

Then the d(i,j) values so obtained are summed in each column of the table 14 of values by applying the following equation:

$$s(j) = \sum_{i=1}^{L} d(i, j) \quad (2)$$

A row 16 of 2×C−1 values is obtained, corresponding to the respective values s(j) where j is between 1 and 2×C−1. Using the same color code as above, the row 16 illustrates zero values for all s(j) except for s(C), or in other words except for the column of values in the table 14 of values which represents the block boundary $f_1$ for the pair of blocks of pixels in question.

This row 16 of values corresponds to an indication of a block boundary in one embodiment of the invention.

In one embodiment of the invention, if the condition given below is satisfied, one can deduce from this fact the presence of two uniform blocks of pixels separated by a visible block boundary:

$$\sum_{j=1, j \neq C}^{2*C-1} s(j) = 0 \text{ (condition 1)}.$$

In another embodiment of the invention, two conditions as given below are checked, and when they are satisfied, then there are two uniform blocks of pixels with a visible block boundary:

$$\sum_{j=1, j \neq C}^{2*C-1} s(j) = 0 \text{ (condition 1)},$$

and $$-0 < s(C) < \text{threshold-value (condition 2)},$$

where threshold-value is a threshold value which advantageously can be determined as a function of the context of the image, such as the contrasts presented by the image.

Otherwise, meaning in the case where at least one or the other of the conditions (condition 1) and (condition 2) is not satisfied, a visible block boundary between uniform zones has not been detected.

To provide a reliable result relating to the block boundaries in an image, it is important not to confuse the block boundaries artificially induced by image processing with a faithful rendering of the image which may present natural discontinuities in the color level particularly in the contours of an object.

Comparison of the value of s(C) with a threshold value allows avoiding confusion between a block boundary and the contour of an object in the image, which would then be a true characteristic of the original image and not image noise.

The indication of a block boundary between the block 11 of pixels and the block 12 of pixels, which is illustrated here in gray in the row 16 of values, illustrates a visible block boundary in one embodiment of the invention.

On the basis of this indication of a block boundary, it is advantageously also possible to determine in a simple manner whether this block boundary is an invisible block boundary, by applying equations (1) and (2).

If the block boundary $f_1$ is an invisible block boundary, the table 14 of values contains only white cells, with the column of values f1 also being white. Then, as described above with reference to FIG. 1, a row 16 of values is obtained which comprises only white cells.

If the following condition is met, one can deduce that an invisible block boundary has been detected:

$$\sum_{j=1}^{2*C-1} s(j) = 0 \quad \text{condition (3)}.$$

Then, in one embodiment of the invention, if neither condition (3) nor condition (1) nor condition (2) are satisfied, no visible or invisible block boundary has been detected.

From the above paragraphs, it is easy to deduce a determination of an indication of a block boundary between two blocks of pixels in the image in another dimension of the image, meaning by column, with the boundary appearing between the rows. Equation (1) can then be written:

$$d(i,j) = |p(i+1,j) - p(i,j)| \quad (1')$$

A table 17 of values is then obtained comprising C values per row and 2×R−1 values per column. In the example illustrated here, all the values in this table of values are zero, and are therefore represented in white.

Then the d(i,j) values so obtained are summed in each row of the table 17 of values by applying the following equation:

$$s(i) = \sum_{j=1}^{C} d(i, j) \quad (2')$$

A column 18 of values is then obtained which corresponds to the indication of the boundary in question in one embodiment of the invention.

The above paragraphs referring to FIG. 1 describe a determination of an indication of a block boundary, meaning the row 16 and/or 18 of values, which is jointly used to detect a visible block boundary or to determine an invisible block boundary and then potentially a uniform distortion zone.

In one embodiment of the invention, an image comprises multiple pairs of blocks of pixels and, in order to be able to determine a quality level for the image, it is advantageous to examine this image and determine indications for at least a part of the block boundaries or determine indications for all block boundaries in the image, for at least one dimension of the image or for all dimensions of the image.

Figure 2:
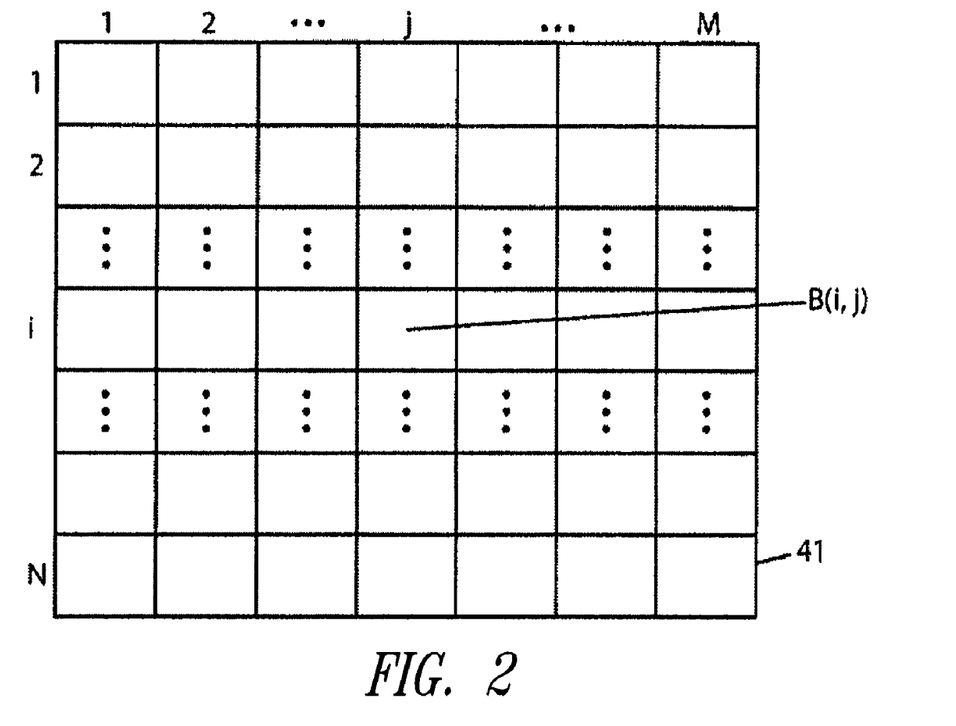
FIG. 2 illustrates an image architecture based on blocks of pixels in one embodiment of the invention.

FIG. 2 illustrates an image in one embodiment of the invention. Such an image 41 comprises a number M of blocks of pixels B(i,j) per row, meaning for j between 1 and M, and a number N of blocks of pixels B(i,j) per column, meaning for i between 1 and N.

It is possible to apply a method in one embodiment of the invention which successively considers pairs of blocks of pixels in each row from 1 to N, such that an indication is determined for all block boundaries in each row.

Thus in row i, where i is between 1 and N, the steps described above with reference to the pair of blocks 11, 12 of pixels are applied to each pair [B(i,j); B(i,j+1)], for j from 1 to M−1.

In one variation, one can travel the columns of blocks of pixels in the image, and apply the steps described above for the pair of blocks 11, 12 of pixels in the direction i, to all or part of the pairs of blocks of pixels in the series in question in each column [(B(i,j); B(i+1,j)], for all or part of the columns and for i from 1 to N−1, such as for example the pair of blocks 11, 13 of pixels in direction j.

In row 1, the pair of blocks of pixels comprising the first block of pixels and the second block of pixels in the first row of the image in question, meaning the pair [B(1,1); B(1,2)], is first processed so as to provide a corresponding indication, as described above with reference to FIG. 1. Then the pair of blocks of pixels comprising the second block of pixels and the third block of pixels, meaning the pair [B(1,2); B(1,3)], is processed in the same manner. This continues through the last pair of blocks of pixels in the first row of blocks of pixels in the image, meaning the pair of blocks of pixels [B(1, M−1); B(1, M)].

Then each row of blocks of pixels in the image is processed in the same manner, through the last row N of blocks of pixels in the image.

From this embodiment of the invention, it is easy to deduce other embodiments where the blocks of pixels in the image are paired and examined by column and not by row of blocks of pixels in the image.

One can also advantageously attempt not only the detection of visible and invisible block boundaries between the blocks of pixels by row, but also between the blocks of pixels by column of blocks of pixels in the image in question.

Figure 3:
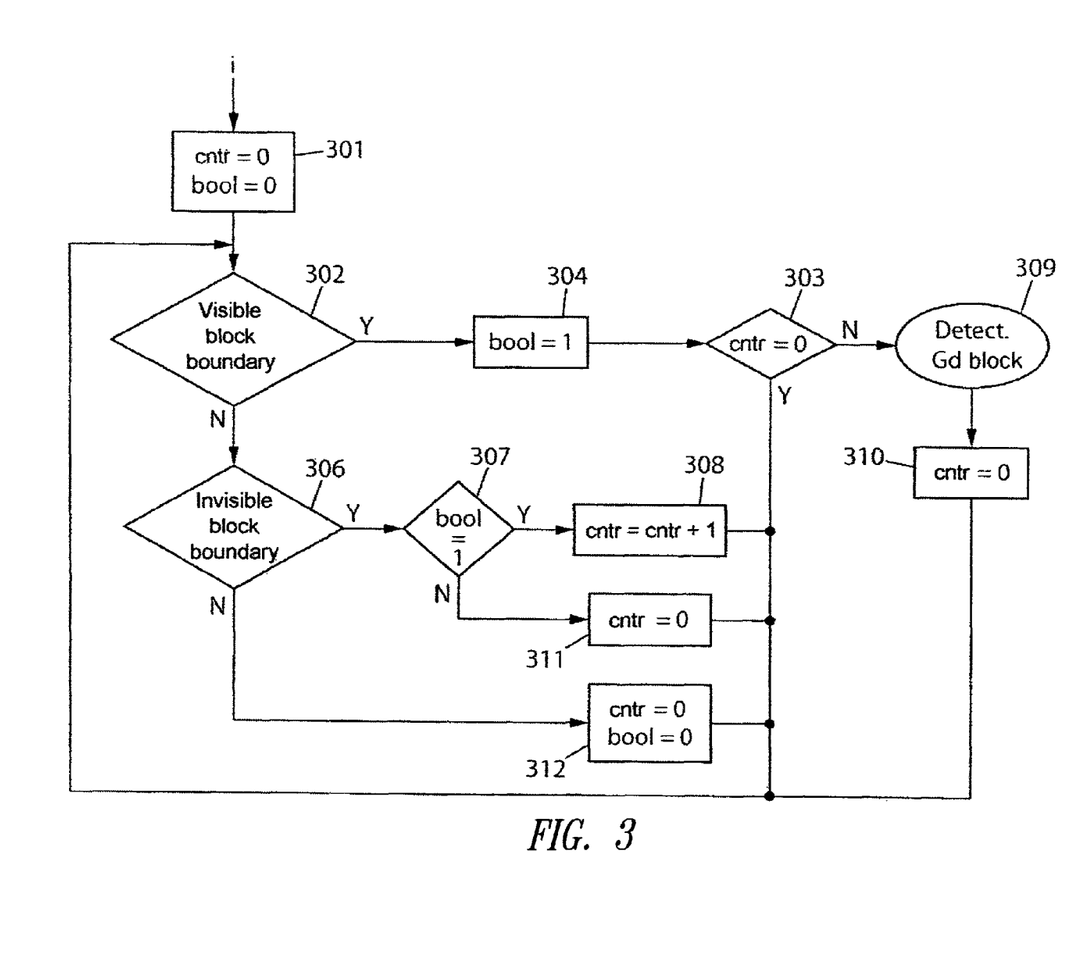
FIG. 3 illustrates the main steps of a method for processing an image in one embodiment of the invention.

FIG. 3 illustrates the main steps in a method for processing an image according to one embodiment of the invention. In this embodiment, successive rows of blocks of pixels are processed in the image.

In the example described below, the blocks of pixels in the image are successively received, row by row, from an incoming signal i.

In a step 301, a counter cntr as well as a boolean bool are initialized to 0. The boolean is set to the value of 1 when a visible block boundary is detected. The counter cntr indicates the number of invisible block boundaries detected within a uniform distortion zone which comprises a whole number of blocks of pixels B(i,j). This counter is therefore incremented with each detection of an invisible block boundary if the boolean is set to 1, meaning between two visible block boundaries.

In a step 302, a detection of a visible block boundary is implemented. This visible block boundary detection step is based on the equations described above and on a check of the conditions (condition 1) and (condition 2). In this manner, each pair of blocks of pixels is successively examined to determine whether a visible block boundary separates them.

If a visible block boundary is detected between two blocks of pixels in a given pair of blocks of pixels, or in other words if conditions (1) and (2) are met, a step 304 is implemented, during which the value of the boolean bool is set to 1. Then in a step 303, the value of the counter is checked. If the counter cntr has a value of 0, meaning no invisible block boundary has yet been detected since the detection of the last visible block boundary, the process returns to step 302 in order to search for the next visible or invisible block boundary. If the value of the counter is not 0, then the process enters step 309. This step 309 marks the end of the detection of a uniform distortion zone in the image. After this step 309, a step 310 is implemented, during which the value of the counter cntr is reset to 0.

If, in step 302, the block boundary between two blocks of pixels is not a visible block boundary, step 306 is applied which checks whether this block boundary is an invisible block boundary.

If this boundary is an invisible block boundary, the value of the boolean is checked in a step 307. If the boolean is set to 1, meaning a visible block boundary has previously been detected, the counter cntr is incremented by 1 in a step 308 in order to count the number of invisible block boundaries contained between two visible block boundaries. Then, after such a detection has been indicated in the value of the counter cntr, the process returns to step 302.

If, after detection of an invisible block boundary in step 306, the boolean has a value of 0, then a step 311 is implemented in which the counter cntr is set to 0. This step covers the case where an invisible boundary is detected without a visible block boundary having previously been detected. In this case, the value of the counter is reinitialized to 0, because this counter represents the number of invisible boundaries detected since the last detected visible block boundary. After step 311 the process returns to step 302.

If neither a visible block boundary was detected in step 302, nor an invisible block boundary was detected in step 306, a step 312 is implemented, in which the respective values of the counter cntr and the boolean bool are reinitialized to 0. This step covers the case where a block boundary corresponds to an object contour in the original image.

In one embodiment of the invention, the process continues to be applied by returning to step 302 to examine the next pair of blocks of pixels.

Note that no limitation is imposed on the order in which the steps are performed. The order illustrated in FIG. 3 is provided as an example only.

After examining all pairs of blocks of pixels in each row of the image in question, as described above, it is possible to obtain the number of uniform distortion zones identified in the image in question, as well as their size. It is sufficient to store the number of invisible block boundaries detected in each of these uniform distortion zones, in order to know the number of blocks of pixels B(i,j) respectively contained in these zones.

In addition, it is also easy to obtain the number of visible block boundaries detected in the image.

This information allows deducing an image quality level. The greater the size of the uniform distortion zones and the greater their number, the lower the image quality level.

In addition, the higher the number of visible block boundaries, the lower the image quality level.

This information concerning the quality level can easily be obtained by applying a method according to an embodiment of the invention. The information can advantageously be provided to algorithms used to determine image quality levels.

Figure 4:
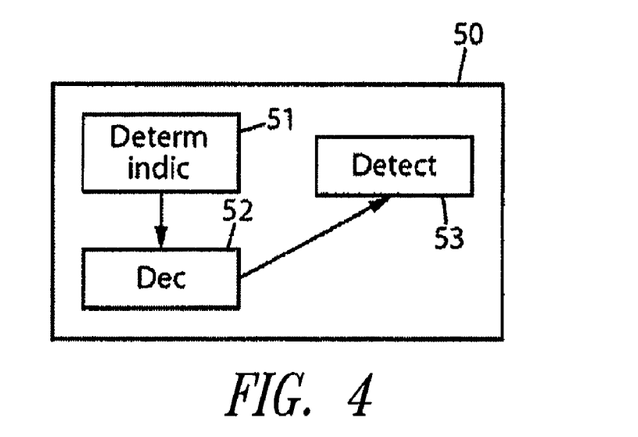
FIG. 4 illustrates an image processing device in one embodiment of the invention.

FIG. 4 illustrates an image processing device in one embodiment of the invention.

Such a device comprises a determination unit 51 for determining an indication of a block boundary between the first and second blocks of pixels in a pair of blocks of pixels.

In addition it comprises a decision unit 52 for deciding, on the basis of the indication determined by the determination unit 51, whether a detected block boundary is a visible block boundary or an invisible block boundary.

It also comprises a uniform distortion zone detection unit 53 for deciding that a uniform distortion zone is detected when at least one invisible block boundary is detected between two visible block boundaries.

The determination unit can additionally be structured to:
obtain a table 14 of 2×C−1 columns of R values, each corresponding to a difference between two consecutive pixel values in a row in the pair of blocks 11, 12 of pixels, and
obtain a row 16 of 2×C−1 combined values by respectively summing the values in the 2×C−1 columns previously obtained, with these 2×C−1 combined values corresponding to the indication of a block boundary.

The determination unit 51 can additionally be structured to:
obtain a table 17 of 2×R−1 rows of C values, each corresponding to a difference between two consecutive pixel values in a column in the pair of blocks of pixels, and
obtain a column 18 of 2×R−1 combined values by respectively summing the values in the 2×R−1 rows previously obtained, with these 2×R−1 combined values corresponding to the indication of a block boundary.

The decision unit 52 can be structured to decide that a visible block boundary is detected when at least the following conditions are met:
the sum of the combined values except for the central combined value is equal to 0, and
the central combined value is less than a threshold value.

In addition, the decision unit can decide that an invisible block boundary is detected if the following condition is met:
the sum of the combined values is equal to zero.

The various embodiments described above can be combined to provide further embodiments. All of the foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
processing an image in a first dimension and a second dimension, the image including a series of M blocks of pixels in the first dimension and a series of N blocks of pixels in the second dimension forming M columns of blocks of pixels and N rows of blocks of pixels respectively, where M and N are whole non-zero numbers, each row and/or column of blocks of pixels including a series of pairs of blocks of pixels each including adjacent first and second blocks of pixels, the second block of pixels in a preceding pair of blocks corresponding to the first block of pixels in a next pair of blocks, the processing including the following steps for at least a part of the pairs of blocks of pixels of at least a part of said rows and/or columns of blocks of pixels in said image:
/a/ determining an indication of a block boundary between the respective first and second blocks of pixels in said pair of blocks of pixels,
/b/ deciding, based on said indication of a block boundary whether the block boundary is a visible block boundary or an invisible block boundary, and
/c/ repeating steps /a/ and /b/ for a next pair of blocks of pixels,
wherein, if at least one invisible block boundary is present between two visible block boundaries, it is decided that a uniform distortion zone is detected in the image, with the visible block boundary or boundaries and the uniform distortion zone or zones indicating an image quality level.

2. A method for processing an image according to claim 1, wherein, when each block of pixels comprises a number C of columns of pixels and a number R of rows of pixels, with C and R being whole non-zero numbers, and wherein the determining the indication of a block boundary includes:

/1/ obtaining 2×R−1 rows of C values, each successively corresponding to a difference between two consecutive pixel values in a column in the corresponding pair of blocks of pixels, and /2/ obtaining 2×R−1 combined values by respectively summing the values in the 2×R−1 rows obtained in step /1/, with said 2×R−1 combined values corresponding to the indication of a block boundary for the corresponding pair of blocks of pixels.

3. A method for processing an image according to claim 1, wherein, when each block of pixels comprises a number C of columns of pixels and a number R of rows of pixels, with C and R being whole non-zero numbers, and wherein the determining the indication of a block boundary includes:

/1/ obtaining 2×C−1 columns of R values, each successively corresponding to a difference between two consecutive pixel values in a row in the corresponding pair of blocks of pixels, and /2/ obtaining 2×C−1 combined values by respectively summing the values in the 2×C−1 columns obtained in step /1/, with said 2×C−1 combined values corresponding to said indication of a block boundary for the corresponding pair of blocks of pixels.

4. A method for processing an image according to claim 3, wherein the deciding step /b/ includes deciding that a block boundary is a visible block boundary when at least the following condition is met:
a sum of the combined values, excluding a central combined value, is equal to 0.

5. A method for processing an image according to claim 4, wherein the deciding step /b/ includes deciding that a block boundary is a visible block boundary when in addition at least the following condition is met:
the central combined value is less than a threshold value.

6. A method for processing an image according to claim 3, wherein the deciding step /b/ includes deciding that a block boundary is an invisible block boundary when the following condition is met:
a sum of the combined values is equal to zero.

7. A device, comprising:
a processing unit structured to process an image in a first dimension and a second dimension, the image including a series of M blocks of pixels in the first dimension and a series of N blocks of pixels in the second dimension, forming M columns of blocks of pixels and N rows of blocks of pixels, where M and N are whole non-zero numbers, each row and/or column of blocks of pixels including a series of pairs of blocks of pixels each including adjacent first and second blocks of pixels, the second block of pixels in a preceding pair of blocks corresponding to the first block of pixels in a next pair of blocks, the processing unit including:
a determination unit for determining an indication of a block boundary between the first and second blocks of pixels of a pair of blocks of pixels,
a decision unit for deciding based on said indication whether the block boundary is a visible block boundary or an invisible block boundary, and
a uniform distortion zone detection unit for deciding that a uniform distortion zone is detected when at least one invisible block boundary is present between two visible block boundaries.

8. A device for processing an image according to claim 7, wherein, when each block of pixels comprises a number C of columns of pixels and a number R of rows of pixels, with C and R being whole non-zero numbers, the indication of a block boundary is determined by the determination unit which is additionally structured to:
obtain 2×C−1 columns of R values, each corresponding to a difference between two consecutive pixel values in a row in the corresponding pair of blocks of pixels, and
obtain 2×C−1 combined values by respectively summing the values in the 2×C−1 columns obtained previously, with said 2×C−1 combined values corresponding to said indication of a block boundary for the corresponding pair of blocks of pixels.

9. A device for processing an image according to claim 7, wherein, when each block of pixels comprises a number C of columns of pixels and a number R of rows of pixels, with C and R being whole non-zero numbers, the indication of a block boundary is determined by the determination unit which is additionally structured to:
obtain 2×R−1 rows of C values, each corresponding to a difference between two consecutive pixel values in a column in the corresponding pair of blocks of pixels, and
obtain 2×R−1 combined values by respectively summing the values in the 2×R−1 columns obtained previously, with said 2×R−1 combined values corresponding to the indication of a block boundary for the corresponding pair of blocks of pixels.

10. A device for processing an image according to claim 9, wherein the decision unit decides that a block boundary is a visible block boundary when at least the following conditions are met:
a sum of the combined values except for a central combined value is equal to 0, and
the central combined value is less than a threshold value.

11. A device for processing an image according to claim 9, wherein the decision unit decides that a block boundary is an invisible block boundary if the following condition is met:
a sum of the combined values is equal to zero.

12. A video signal decoder comprising:
an image processing device that includes a processing unit structured to process an image in a first dimension and a second dimension, the image including a series of M blocks of pixels in the first dimension and a series of N blocks of pixels in the second dimension, forming M columns of blocks of pixels and N rows of blocks of pixels, where M and N are whole non-zero numbers, each row and/or column of blocks of pixels including a series of pairs of blocks of pixels each including adjacent first and second blocks of pixels, the second block of pixels in a preceding pair of blocks corresponding to the first block of pixels in a next pair of blocks, the processing unit including:
a determination unit for determining an indication of a block boundary between the first and second blocks of pixels of a pair of blocks of pixels,
a decision unit for deciding based on said indication whether the block boundary is a visible block boundary or an invisible block boundary, and
a uniform distortion zone detection unit for deciding that a uniform distortion zone is detected when at least one invisible block boundary is present between two visible block boundaries.

13. The video signal decoder of claim 12 wherein the video signal decoder is a set top box.

14. A non-transitory computer readable medium having contents that cause a computing device to perform a method comprising:
processing an image in a first dimension and a second dimension, the image including a series of M blocks of pixels in the first dimension and a series of N blocks of pixels in the second dimension forming M columns of blocks of pixels and N rows of blocks of pixels respectively, where M and N are whole non-zero numbers, each row and/or column of blocks of pixels including a series of pairs of blocks of pixels each including adjacent first and second blocks of pixels, the second block of pixels in a preceding pair of blocks corresponding to the first block of pixels in a next pair of blocks, the processing including the following steps for at least a part of the pairs of blocks of pixels of at least a part of said rows and/or columns of blocks of pixels in said image:
/a/ determining an indication of a block boundary between the respective first and second blocks of pixels in said pair of blocks of pixels,
/b/ deciding, based on said indication of a block boundary whether the block boundary is a visible block boundary or an invisible block boundary, and
/c/ repeating steps /a/ and /b/ for a next pair of blocks of pixels,
wherein, if at least one invisible block boundary is present between two visible block boundaries, it is decided that a uniform distortion zone is detected in the image, with the visible block boundary or boundaries and the uniform distortion zone or zones indicating an image quality level.

15. The computer readable medium of claim 14, wherein, when each block of pixels comprises a number C of columns of pixels and a number R of rows of pixels, with C and R being whole non-zero numbers, and wherein the determining the indication of a block boundary includes:
/1/ obtaining 2×R−1 rows of C values, each successively corresponding to a difference between two consecutive pixel values in a column in the corresponding pair of blocks of pixels, and
/2/ obtaining 2×R−1 combined values by respectively summing the values in the 2×R−1 rows obtained in step /1/, with said 2×R−1 combined values corresponding to the indication of a block boundary for the corresponding pair of blocks of pixels.

16. The computer readable medium of claim 14, wherein, when each block of pixels comprises a number C of columns of pixels and a number R of rows of pixels, with C and R being whole non-zero numbers, and wherein the determining the indication of a block boundary includes:
/1/ obtaining 2×C−1 columns of R values, each successively corresponding to a difference between two consecutive pixel values in a row in the corresponding pair of blocks of pixels, and
/2/ obtaining 2×C−1 combined values by respectively summing the values in the 2×C−1 columns obtained in step /1/, with said 2×C−1 combined values corresponding to said indication of a block boundary for the corresponding pair of blocks of pixels.

17. The computer readable medium of claim 16, wherein the deciding step /b/ includes deciding that a block boundary is a visible block boundary when at least the following condition is met:
a sum of the combined values, excluding a central combined value, is equal to 0.

18. The computer readable medium of claim 17, wherein the deciding step /b/ includes deciding that a block boundary is a visible block boundary when in addition at least the following condition is met:
the central combined value is less than a threshold value.

19. The computer readable medium of claim 16, wherein the deciding step /b/ includes deciding that a block boundary is an invisible block boundary when the following condition is met:
a sum of the combined values is equal to zero.

20. A method, comprising:
processing an image that includes a series of pairs of blocks of pixels each including adjacent first and second blocks of pixels, the second block of pixels in a preceding pair of blocks corresponding to the first block of pixels in a next pair of blocks, wherein, for at least a part of the pairs of blocks of pixels, the processing includes:
/a/ determining an indication of a block boundary between the respective first and second blocks of pixels in said pair of blocks of pixels,
/b/ deciding, based on said indication of a block boundary whether the block boundary is a visible block boundary or an invisible block boundary, and
/c/ repeating steps /a/ and /b/ for a another pair of the pairs of blocks of pixels,
wherein, if at least one invisible block boundary is present between two visible block boundaries, it is decided that a uniform distortion zone is detected in the image, with the visible block boundary or boundaries and the uniform distortion zone or zones indicating an image quality level.

21. A method according to claim 20, wherein each block of pixels comprises a number C of columns of pixels and a number R of rows of pixels, with C and R being whole non-zero numbers, the determining includes:
/1/ obtaining 2×R−1 rows of C values, each successively corresponding to a difference between two consecutive pixel values in a column in the corresponding pair of blocks of pixels, and
/2/ obtaining 2×R−1 combined values by respectively summing the values in the 2×R−1 rows obtained in step /1/, with said 2×R−1 combined values corresponding to the indication of a block boundary for the corresponding pair of blocks of pixels.

22. A method according to claim 20, wherein, when each block of pixels comprises a number C of columns of pixels and a number R of rows of pixels, with C and R being whole non-zero numbers, and wherein the determining includes:
/1/ obtaining 2×C−1 columns of R values, each successively corresponding to a difference between two consecutive pixel values in a row in the corresponding pair of blocks of pixels, and
/2/ obtaining 2×C−1 combined values by respectively summing the values in the 2×C−1 columns obtained in step /1/, with said 2×C−1 combined values corresponding to said indication of a block boundary for the corresponding pair of blocks of pixels.

23. A method according to claim 22, wherein the deciding step /b/ includes deciding that a block boundary is a visible block boundary when at least the following condition is met:
a sum of the combined values, excluding a central combined value, is equal to 0.

24. A method for processing an image according to claim 23, wherein the deciding step /b/ includes deciding that a block boundary is a visible block boundary when in addition at least the following condition is met:
the central combined value is less than a threshold value.

25. A method according to claim 22, wherein the deciding step /b/ includes deciding that a block boundary is an invisible block boundary when the following condition is met:
a sum of the combined values is equal to zero.

* * * * *